(12) United States Patent
Hasegawa

(10) Patent No.: US 8,134,745 B2
(45) Date of Patent: Mar. 13, 2012

(54) IMAGE PROCESSING APPARATUS INCLUDING COMPENSATION UNIT PERFORMING COMPENSATION IN A PRINTING DIRECTION AND IMAGE PROCESSING METHOD PERFORMING COMPENSATION IN A PRINTING DIRECTION THEREOF

(75) Inventor: Jun Hasegawa, Seongnam-si (KR)

(73) Assignee: Samsung Electronics Co., Ltd., Suwon, Si (KR)

( * ) Notice: Subject to any disclaimer, the term of this patent is extended or adjusted under 35 U.S.C. 154(b) by 914 days.

(21) Appl. No.: 12/021,411

(22) Filed: Jan. 29, 2008

(65) Prior Publication Data

US 2008/0187216 A1   Aug. 7, 2008

(30) Foreign Application Priority Data

Feb. 6, 2007 (KR) .................. 10-2007-0012238

(51) Int. Cl.
- *G06T 5/00* (2006.01)
- *G06F 15/00* (2006.01)
- *H04N 1/405* (2006.01)
- *G06K 9/00* (2006.01)
- *G06K 9/40* (2006.01)

(52) U.S. Cl. ....... 358/1.9; 358/3.27; 358/3.06; 382/162; 382/269

(58) Field of Classification Search .......... None
See application file for complete search history.

(56) References Cited

U.S. PATENT DOCUMENTS

| | | | | |
|---|---|---|---|---|
| 5,260,809 A * | 11/1993 | Tachikawa | ............... | 358/461 |
| 5,835,819 A | 11/1998 | Yamamoto | | |
| 5,990,965 A * | 11/1999 | Herz et al. | ............... | 348/446 |
| 6,760,126 B1 | 7/2004 | Kritayakirana et al. | | |
| 7,085,003 B1 * | 8/2006 | Belkhir | ............... | 358/1.9 |
| 2003/0007183 A1 * | 1/2003 | Ishiguro | ............... | 358/2.1 |
| 2004/0114167 A1 * | 6/2004 | Imai | ............... | 358/1.9 |
| 2005/0031032 A1 * | 2/2005 | Shen et al. | ............... | 375/240.01 |
| 2005/0062995 A1 * | 3/2005 | Loce et al. | ............... | 358/1.9 |

FOREIGN PATENT DOCUMENTS

| | | |
|---|---|---|
| GB | 2 338 075 | 8/1999 |
| JP | 7-290736 | 11/1995 |
| JP | 9-65142 | 3/1997 |
| JP | 2003-224723 | 8/2003 |

OTHER PUBLICATIONS

European Search Report issued by the European Patent Office on Feb. 16, 2009.
Korean Office Action issued Apr. 6, 2011 in corresponding Korean Patent Application 10-2007-0012238.
European Office Action issued Oct. 17, 2011 in corresponding Korean Patent Application 08 101 287.4.

* cited by examiner

*Primary Examiner* — Twyler Haskins
*Assistant Examiner* — Christopher D Wait

(57) ABSTRACT

An image processing apparatus, which includes an image processing unit to perform image processing for image data corresponding to an image to be formed on a printable medium; and a compensation unit to performs compensation processing on the image processed image data by increasing, by a compensation amount, a depth of shade of a pixel arranged in a printing direction adjacent to a solid pixel having a depth of shade greater than a predetermined value, so as to compensate for a depth deterioration of the adjacent pixel.

5 Claims, 6 Drawing Sheets

IMAGE PROCESSING APPARATUS INCLUDING COMPENSATION UNIT PERFORMING COMPENSATION IN A PRINTING DIRECTION AND IMAGE PROCESSING METHOD PERFORMING COMPENSATION IN A PRINTING DIRECTION THEREOF

CROSS-REFERENCE TO RELATED APPLICATION

This application claims all benefits accruing under 35 U.S.C.§119 from Korean Patent Application No. 2007-12238, filed in the Korean Intellectual Property Office on Feb. 6, 2007, the disclosure of which is incorporated herein by reference.

BACKGROUND OF THE INVENTION

1. Field of the Invention

Aspects of the present invention relate to an image processing apparatus, an image processing method, and a computer-readable recording medium thereof and, more particularly, to an image processing apparatus and an image processing method capable of processing an edge effect and a computer-readable recording medium thereof.

2. Related Art

An image forming apparatus, such as a laser printer, forms an image onto a paper or other printable medium based on received image data. The image forming apparatus may directly perform image processing required for the image data, or may receive the processed image data from an image processing apparatus such as a computer system.

FIG. 1 shows an image formed by a conventional image forming apparatus. In FIG. 1, reference numeral 11 represents at least one pixel whose depth of shade is at a maximum, for example, black (hereinafter referred to as "solid pixels"). Reference numeral 12 represents at least one pixel whose depth of shade is not the maximum, for example, grey (hereinafter referred to as "intermediate pixels"). "A" represents a main scanning direction and "B" represents a sub-scanning direction (hereinafter referred to as "printing direction") while an image 1 is formed by the image forming apparatus. The printing direction B is the direct opposite to a conveying direction of the printable medium on which the image 1 is formed.

According to the conventional image forming apparatus, as shown in FIG. 1, if the intermediate pixel 12 is adjacent to or near the solid pixel 11, deterioration of the depth of shade (reference numeral 13 in FIG. 1, hereinafter referred to as "depth deteriorated pixels") may be generated unexpectedly due to an edge effect in the intermediate pixel 12 arrayed in the printing direction B adjacent to the solid pixel 11.

If a development voltage adjustment cannot prevent such depth deterioration, many changes in mechanical components, optical systems, developing processes, etc., are needed to prevent the depth deterioration, which results in increased costs, difficulties in manufacturing, and other problems.

SUMMARY OF THE INVENTION

Aspects of the present invention provide an image processing apparatus, image processing method and computer-readable recording medium thereof where depth deterioration due to an edge effect can be prevented.

Additional aspects of the present invention provide an image processing apparatus, image processing method, and computer-readable recording medium thereof where the depth deterioration due to the edge effect can be prevented at comparably small cost.

Additional aspects and/or advantages of the invention will be set forth in part in the description which follows and, in part, will be obvious from the description, or may be learned by practice of the invention.

According to an aspect of the present invention an image processing apparatus is provided. The image processing apparatus includes an image processing unit to perform image processing for image data corresponding to an image to be formed on a printable medium medium; and a compensation unit to perform compensation processing on the image processed image data by increasing, by a compensation amount, a depth of shade of a pixel arranged in a printing direction adjacent to a solid pixel having a depth of shade greater than a predetermined value, so as to compensate for a depth deterioration of the adjacent pixel.

According to another aspect of the invention, the compensation amount corresponds to a depth of shade of a test image formed by an image forming apparatus that forms the image.

According to another aspect of the invention, the compensation amount is increased according to a number of successive solid pixels in a printing direction of the printable medium.

According to another aspect of the invention, the number of the successive solid pixels is less than a predetermined amount.

According to another aspect of the invention, the compensation amount is decreased exponentially in a conveying direction of the printable medium that is perpendicular to the printing direction.

According to another aspect of the invention, the compensation unit performs the compensation processing of the image data per line of the image.

According to another aspect of the invention, the depth of shade of the solid pixel is a maximum value.

According to an aspect of the invention, the image has colors of cyan C, magenta M, yellow Y and black K, and the compensation unit performs the compensation processing for the image data corresponding to the color K.

According to another aspect of the present invention, an image processing method to process an image to be formed on a printable medium by an image forming apparatus is provided. The method includes determining a solid pixel having a depth of shade greater than a predetermined value, among a plurality of pixels forming an image; and performing compensation processing on the image data to increase the depth of shade of a pixel arranged in a printing direction adjacent to the determined solid pixel by a compensation amount so as to compensate for a depth deterioration of the adjacent pixel; and transmitting the processed image data to the image forming apparatus so as to form the image corresponding to the processed image data onto a printable medium.

According to another aspect of the present invention, a recording medium having a program that includes a code to perform an image processing method as a computer-readable code is provided. The image processing method includes determining a solid pixel having a depth of shade greater than a predetermined value, among a plurality of pixels forming an image; and performing compensation processing on the image data to increase the depth of shade of a pixel arranged in a printing direction adjacent to the determined solid pixel by a compensation amount so as to compensate for a depth deterioration of the adjacent pixel; and transmitting the processed image data to an image forming apparatus so as to form the image corresponding to the processed image data onto a printable medium.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
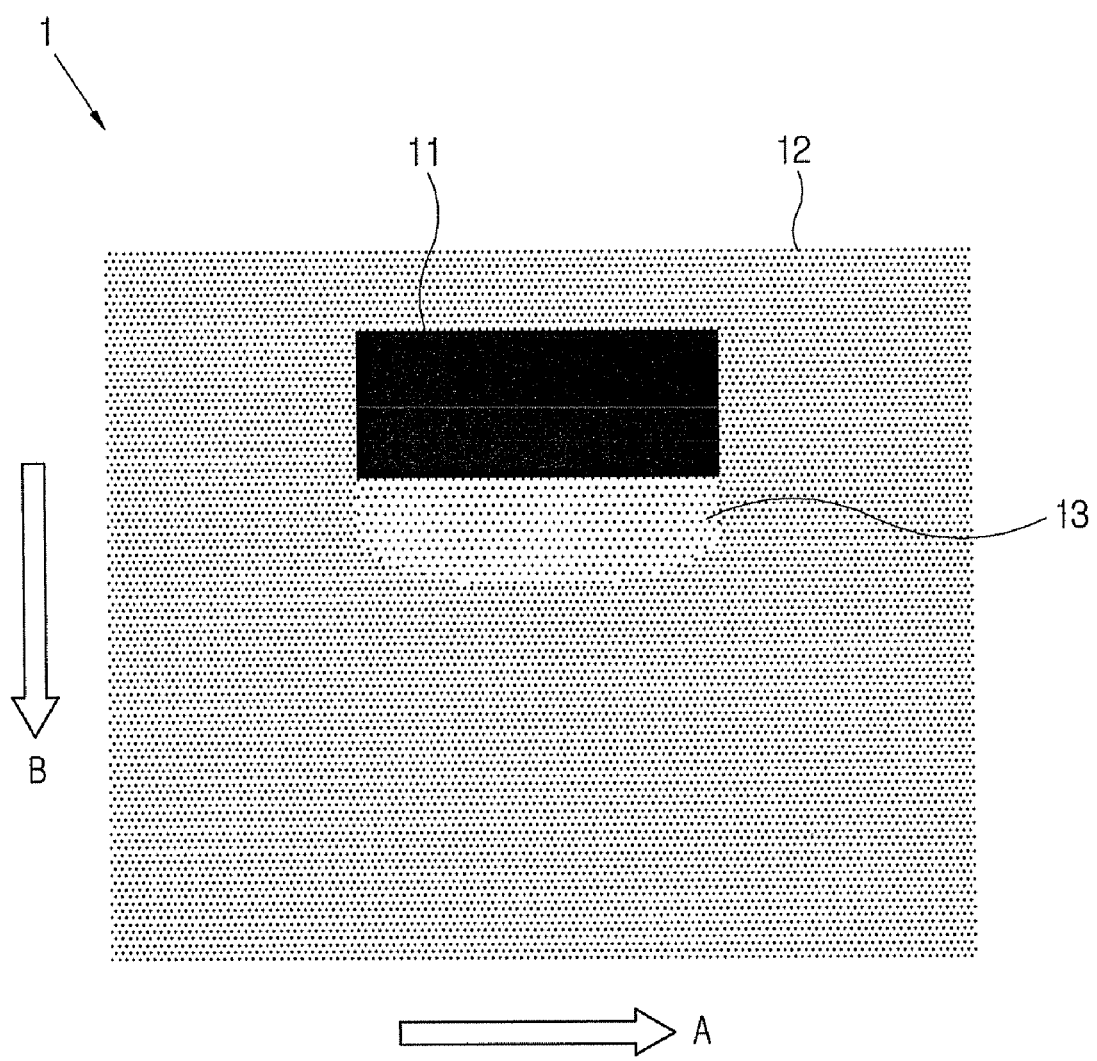
FIG. 1 is an example of an image formed by a conventional image forming apparatus.

Reference will now be made in detail to the present embodiments of the present invention, examples of which are illustrated in the accompanying drawings, wherein like reference numerals refer to like elements throughout. The embodiments are described below in order to explain the present invention by referring to the figures.

Figure 2:
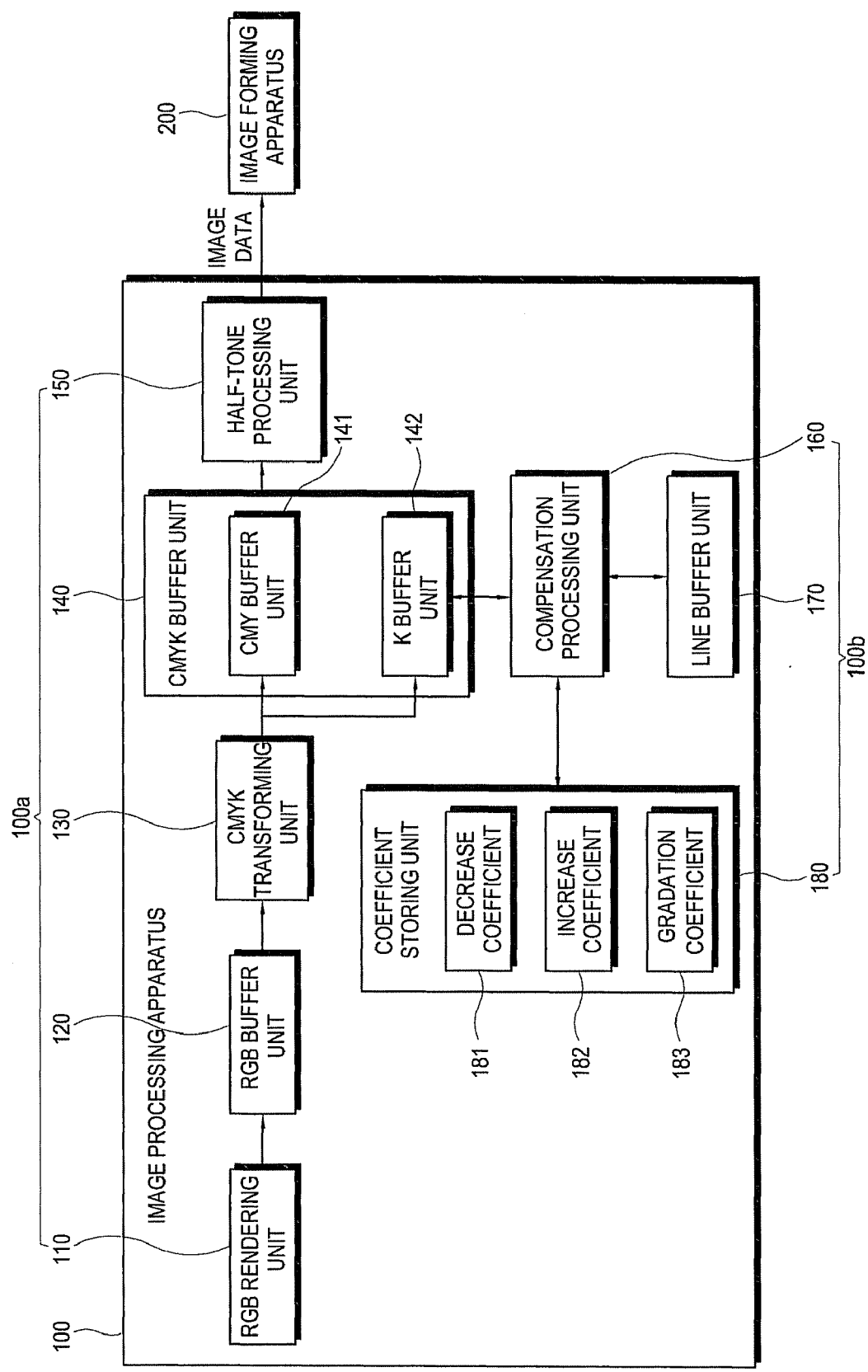
FIG. 2 is a block diagram of an image processing apparatus according to an example embodiment of the present invention.

FIG. 2 is a block diagram of an image processing apparatus 100 according to an example embodiment of the present invention. The image processing apparatus 100 performs image processing on image data corresponding to an image, such as text, drawings, pictures, or other images that can be printed on a printable medium, and transmits the processed image data to the image forming apparatus 200. The image processing apparatus 100 may be a desktop computer, portable computer, personal entertainment device, personal digital assistant, mobile phone, or other computer system. The image forming apparatus 200, which may be a laser printer, inkjet printer or other apparatus capable of forming an image onto a printable medium, forms an image onto a printable medium, such as paper or film, based on image data transmitted by the image processing apparatus 100.

The image processing apparatus 100 includes an image processing unit 100a performing image processing on the image data and a compensation unit 100b performing compensation processing on the image data. The image processing apparatus 100 according to other aspects of the invention may include other units. Similarly, the functionality of one or more units described herein may be combined into a single component.

The image processing unit 100a, as shown in FIG. 2, has an RGB rendering unit 110, an RGB buffer unit 120, a CMYK transforming unit 130, a CMYK buffer unit 140, and a half-tone processing unit 150. The RGB rendering unit 110 performs rendering in the RGB buffer unit 120 according to a rendering command generated by a predetermined application based on original image data. The application provides rendering information to the RGB rendering unit 110, which includes rendering type, coordinates information representing printing positions, rendering colors, etc.

The CMYK transforming unit 130 performs CMYK transforming processing on the RGB data that has been rendered by the RGB rendering unit 110 and stored in the RGB buffer unit 120. CMYK transforming transforms the colors expressed by RGB values into tones of four colors: cyan C, magenta M, yellow Y, and black K. To express the depth of shade of CMYK colors, 8 bits per color, or 256 gradations, may be used. The CMYK data transformed by the CMYK transforming unit 130 is stored in the CMYK buffer unit 140. The CMYK buffer unit 140 includes a CMY buffer unit 141 where CMY data is stored and a K buffer unit 142 where K data is stored. Other aspects of the invention may include additional buffers, such as fours buffers to store data corresponding to each color.

The half-tone processing unit 150 performs half-tone processing on the CMY data that is stored in the CMY buffer unit 141 and the K data that is compensation processed by the compensation unit 100b and stored in the K buffer unit 142. The image forming apparatus 200 forms the image based on the image data that has been half-tone processed by the half-tone processing unit 150.

The compensation unit 100b may include a compensation processing unit 160, a line buffer unit 170, and a coefficient storing unit 180. The compensation processing unit 160 performs compensation processing on the K data stored in the K buffer unit 142 to compensate for depth deterioration due to an edge effect.

Figure 3:
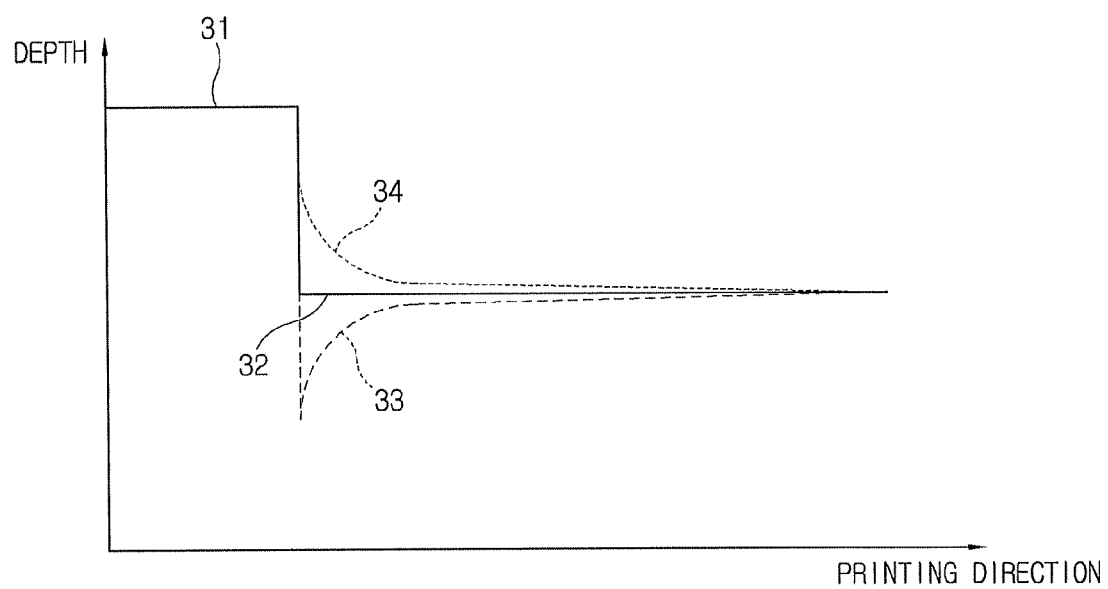
FIG. 3 is an image depth graph to explain compensation processing of a compensation processing unit according to an example embodiment of the present invention.

FIG. 3 is an image depth graph to explain the compensation processing of the compensation processing unit 160. In FIG. 3, reference numeral 31 represents the depth of shade of the solid pixel (hereinafter referred to as "solid black"). Reference numeral 32 represents the depth of shade of the intermediate pixel. Reference numeral 33 represents the depth deterioration due to the edge effect when the image of the intermediate pixel 32 is formed.

As shown in FIG. 3, the compensation processing unit 160 performs compensation processing by increasing the depth of shade of the intermediate pixel 32 (illustrated by reference numeral 34 in FIG. 3) in expectation of the depth deterioration 33. The depth deterioration of the intermediate pixel 32 is offset by the compensation process of the compensation processing unit 160.

Variables required for compensation processing of the K data stored in the K buffer unit 142 are stored in the line buffer unit 170. The line buffer unit 170 has a variables array with the same size as the number of pixels in the main scanning direction (reference numeral A in FIG. 1, hereinafter referred to as "direction x") of the pixel corresponding to the K data. The variables stored in the line buffer unit 170 may be 8 bit integers with no sign.

A decrease coefficient 181, an increase coefficient 182, and a gradation coefficient 183 are stored in the coefficient storing unit 180. The decrease coefficient 181 is a compensation amount determining factor showing an extent of the depth deterioration in the printing direction due to the edge effect of the solid black 31. As represented by reference numeral 34 in FIG. 3, the decrease coefficient 181 may be determined so that the compensation amount decreases exponentially. The increase coefficient 182 is the compensation amount determining factor corresponding to the degree of the depth deterioration caused by one solid black 31.

Figure 4:
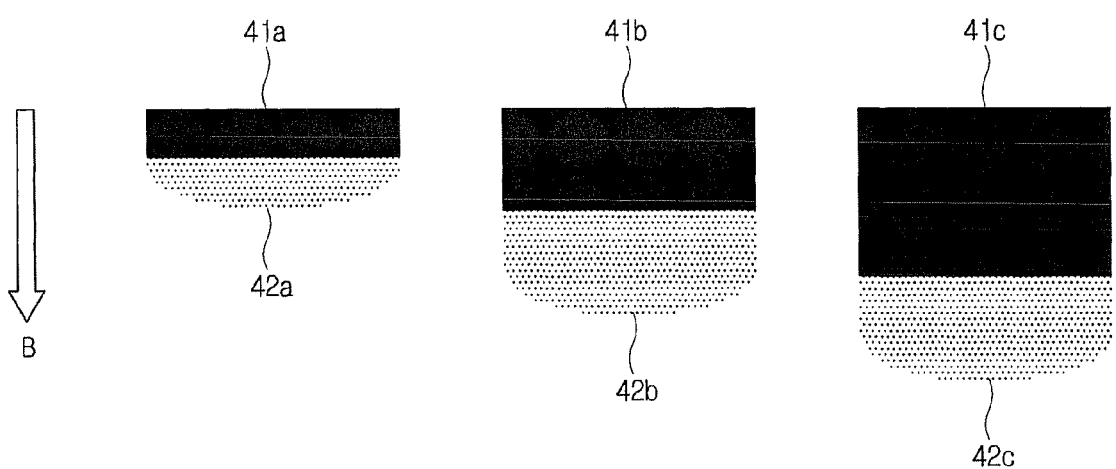
FIG. 4 is a schematic diagram to explain an increase coefficient according to an example embodiment of the present invention.

FIG. 4 is a schematic diagram to explain the increase coefficient 182 according to tan example embodiment of the present invention. As shown in FIG. 4, the depth deterioration occurs at a first intermediate pixel 42*a*, a second intermediate pixel 42*b*, and a third intermediate pixel 42*c* corresponding to a first solid black 41*a*, a second solid black 41*b* and a third solid black 41*c*. The second solid black 41*b* is wider in the printing direction B than the first solid black 41*a*. The second solid black 41*b* has more successive pixels in the printing direction B than the first solid black 41*a*.

The degree of the depth deterioration in the second intermediate pixel 42*b* is greater than that in the first intermediate pixel 42*a*. In the second intermediate pixel 42*b*, the extent of the depth deterioration in the printing direction B is also increased. As the width of the solid black in the printing direction B increases, the increase coefficient 182 reflects the increasing depth deterioration phenomenon by the compensation amount.

However, if the width of the solid black 31 in the printing direction B exceeds a predetermined value, the depth deterioration does not continue to increase. As shown in FIG. 4, though the width of the third solid black 41*c* in the printing direction B is larger than that of the second solid black 41*b*, the amount of the depth deterioration at the third intermediate pixel 42*c* is almost the same as that at the second intermediate pixel 42*b*. For example, the limit value of the width of the solid black 31 in the printing direction B may be about 25 lines.

The gradation coefficient 183 is a compensation amount determining factor that represents the amount of the depth deterioration due to the edge effect according to the gradation of the intermediate pixel 32. The gradation coefficient 183 may be provided for each gradation. For example, in the case of 256 gradations, 256 gradation coefficients 183, one for each gradation, may be stored.

The gradation coefficient 183 may be determined beforehand according to the characteristics of the image forming apparatus 200. For example, a test image having the solid black 31 and the intermediate pixel 32 of a predetermined depth of shade may be formed beforehand by the image forming apparatus 200. The maximum compensation amount obtained by analyzing the depth deterioration of the formed test image may be determined to be the gradation coefficient 183 for the corresponding depth of shade.

Figure 5:
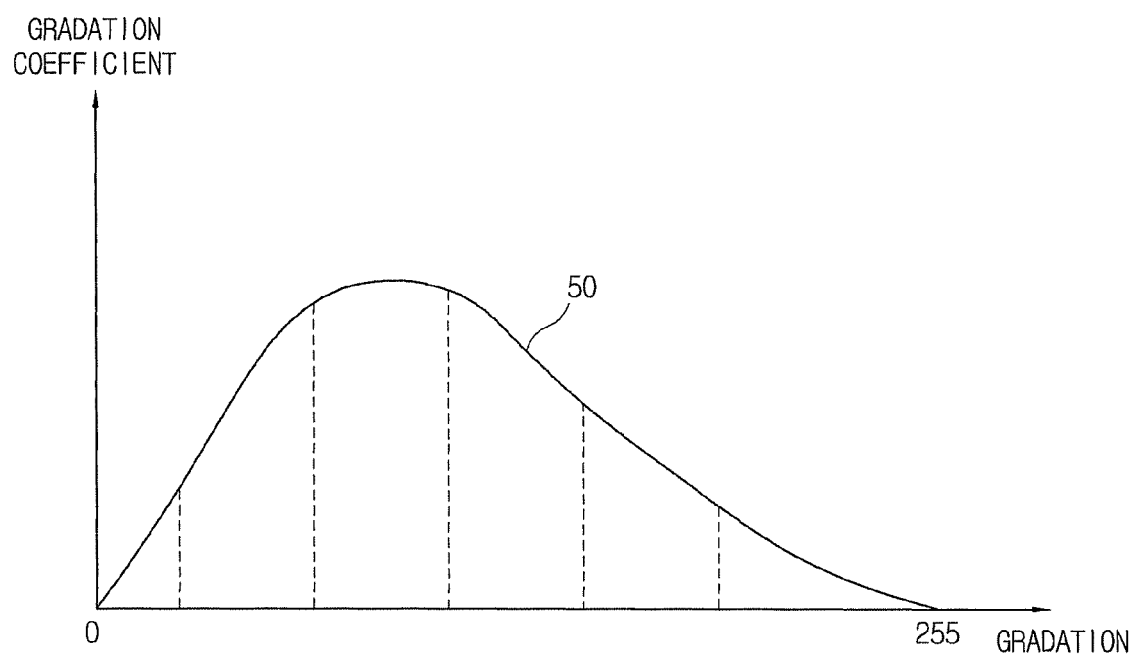
FIG. 5 is a graph of a gradation coefficient obtained by an example embodiment of the present invention.

For example, the gradation coefficients 183 corresponding to 4 or 5 sampled depths of shade except black and white may be obtained from the test image. Interpolation may be performed on the obtained coefficients per gradation 183, thus determining 256 gradation coefficients 183 corresponding to $0^{th}$ to $255^{th}$ gradations. FIG. 5 is a graph 50 of the gradation coefficient 183 obtained by an example embodiment of the present invention.

Figure 6:
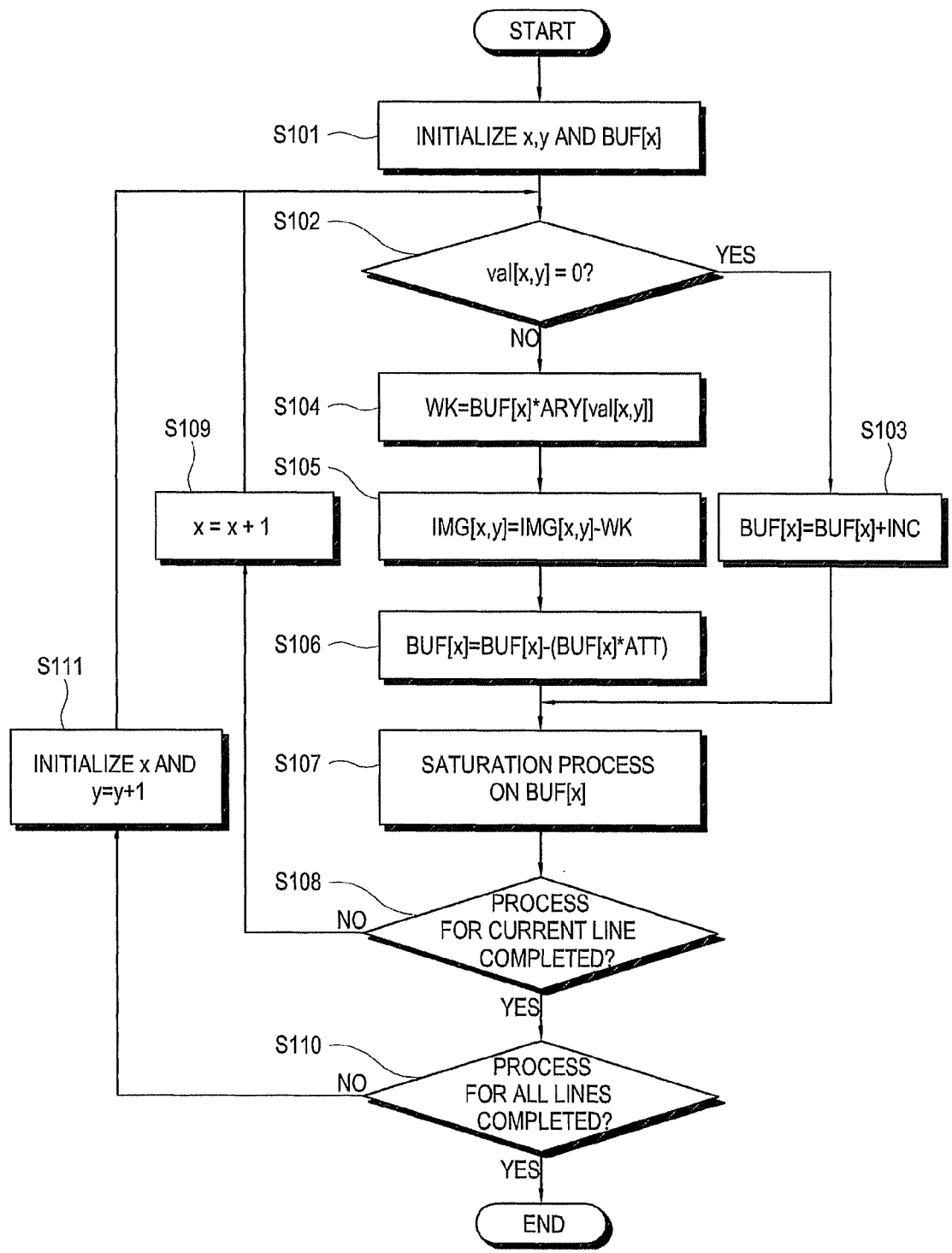
FIG. 6 is a flow diagram describing operating process of the compensation processing unit according to an example embodiment of the present invention.

FIG. 6 is a flow diagram describing a process of the compensation processing unit 160 according to an example embodiment of the present invention. In FIG. 6, x and y represent an x coordinate value (corresponding to the main scanning direction) and a y coordinate value (corresponding to the printing direction). BUF[x] is a variable stored in the line buffer unit 170 and represents a value corresponding to x.

Val[x,y] represents a gradation of the pixel corresponding to x and y in the K data stored in the K buffer unit 142.

ATT represents the decrease coefficient 181 and INC represents the increase coefficient 182. ARY[val[x,y]] represents the gradation coefficient 182 corresponding to val[x,y]. In an example embodiment, ATT may be about 0.1 and INC may be about 10. IMG[x,y] represents the K data stored in the K buffer unit 142 and WK represents the compensation amount for IMG[x,y].

The compensation processing unit 160 performs compensation processing on the K data stored in the K buffer unit 142 line by line in the printing direction B. The compensation processing unit 160 updates IMG[x,y] according to the result of the line by line compensation processing with regard to the y coordinate. The compensation processing is described with regard to x coordinate only; however, processing order in the x coordinate is not limited to the description below.

The compensation processing unit 160 initializes all of x, y and BUF[x] to be 0 at block S101. At block S102, the compensation processing unit 160 determines, from the pixels of the K data stored in the K buffer unit 142, whether val[x,y] of the pixel having x=0, y=0 is 0. At block S102, it is determined whether the current pixel is the solid black (reference numeral 31 illustrated in FIG. 3) having the gradation corresponding to the maximum value of the depth of shade.

If val[x,y] is 0, that is, if the current pixel is the solid black 31, then the compensation processing unit 160 increases the corresponding BUF[x] by INC of the increase coefficient 182 at S103.

If val[x,y] is not 0, then at block S104 the compensation processing unit 160 multiplies BUF[x] by ARY[val[x,y]] of the gradation coefficient 183 to calculate the compensation amount WK. At block S108, the compensation processing unit 160 subtracts the compensation amount WK from IMG [x,y] of the K data stored in the K buffer unit 142 to increase the depth of shade, thus compensating the depth of shade to be deteriorated. The compensation unit 160 subtracts BUF[x] multiplied by ATT of the decrease coefficient 181 from BUF [x] at block S106, thus decreasing the degree of the depth deterioration exponentially.

To prevent an overflow of BUF[x] due to the operations at blocks S103 or S104, the compensation processing unit 160 performs saturation processing on BUF[x] having 8 bits to be between 0 and 255 at block S107. The compensation processing unit 160 checks if the compensation processing is completed for the current line at block S108, that is, if the compensation processing is completed for all x in the current line. If the compensation processing for the current line is not yet completed, the compensation processing unit 160 increases x by 1 at block S109 and returns operations to block S102.

If the compensation processing for the current line is completed, the compensation processing unit 160 checks at block S109 whether the compensation processing has been completed for all lines of the image of K data stored in the K buffer unit 142. It is determined whether the compensation processing has been completed for all y of the current image.

If the compensation processing for all lines is not yet completed, the compensation processing unit 160 initializes x to be 0, increases y by 1 at S111, and returns operation to block S102.

Various components of the image processing apparatus illustrated in FIG. 2 can be integrated into a single control unit, or alternatively, can be implemented in software or hardware, such as, for example, an application specific integrated circuit (ASIC). As such, it is intended that the processes described herein be broadly interpreted as being equivalently performed by software, hardware, or a combination thereof.

As previously discussed, software modules can be written, via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

In addition, the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CD-ROMs, DVDs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although the compensation processing is performed only for the K data in the example embodiments of the present invention described above, the compensation processing according to aspects of the present invention may be performed for the CMY data. Aspects of the present invention may also be applied to a monochrome image processing in the same manner.

Further, although the compensation process of the example embodiments of the present invention has been described to be performed by the image processing apparatus 100, the compensation process according to the present invention may also be performed by the image forming apparatus 200. In this case, the image forming apparatus 200 performing the compensation processing may be included in the image processing apparatus 100 according to an example embodiment of the present invention.

According to aspects the present invention, an image processing apparatus, image processing method, and computer-readable recording medium thereof may be provided where the depth deterioration due to the edge effect can be prevented by compensating the depth of the corresponding image beforehand through prediction of the depth deterioration due to the edge effect. According to aspects of the present invention, the depth deterioration due to the edge effect can be prevented at comparably small cost by performing image processing not by instrumental modification but by software.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the image processing apparatus may include an image forming unit to form the image onto the printable medium and/or a transmitting unit to transmit the image data to an image forming unit. Similarly, a method of processing an image according to aspects of the present invention may include arranging for the processed image data to be printed onto a printable medium. The arranging may include transmitting the processed image data to an image forming apparatus or forming the image corresponding to the image data onto a printable medium. Accordingly, it is intended, therefore, that the present invention not be limited to the various example embodiments disclosed, but that the present invention includes all embodiments falling within the scope of the appended claims.

What is claimed is:

1. An image processing comprising:
    an image processing unit to perform image processing for image data corresponding to an image to be formed on a printable medium; and
    a compensation unit to perform compensation processing on the image processed image data by increasing, by a compensation amount, a depth of shade of a pixel arranged in a printing direction adjacent to a solid pixel having a depth of shade greater than a predetermined value, so as to compensate for a depth deterioration of the adjacent pixel,
    wherein the compensation amount is increased according to a number of successive solid pixels in a printing direction of the printable medium,
    wherein the number of the successive solid pixels is less than a predetermined amount, and
    wherein the compensation amount is decreased exponentially in a conveying direction of the printable medium that is perpendicular to the printing direction.

2. The image processing apparatus according to claim 1, wherein the compensation unit performs the compensation processing of the image data per line of the image.

3. An image processing method to process an image to be formed on a printable medium by an image forming apparatus, the method comprising:
    determining a solid pixel having a depth of shade greater than a predetermined value, among a plurality of pixels forming an image;
    performing compensation processing on the image data to increase the depth of shade of a pixel arranged in a printing direction adjacent to the determined solid pixel by a compensation amount so as to compensate for a depth deterioration of the adjacent pixel; and
    transmitting the processed image data to the image forming apparatus so as to form the image corresponding to the processed image data onto a printable medium,
    wherein the compensation amount corresponds to a depth of shade of a test image formed by the image forming apparatus, wherein the compensation amount is increased according to the number of successive solid pixels in a printing direction of the printable medium, wherein the number of the successive solid pixels is less than a predetermined amount, and wherein the compensation amount is decreased exponentially in a conveying direction of the printable medium.

4. The image processing method according to claim 3, wherein the performing of the compensation processing comprises performing the compensation processing of the image data per line of the image.

5. A method of processing image data corresponding to an image to be printed onto a printable medium so as to compensate for depth deterioration caused by solid black pixels in the image data, the method comprising:

for each pixel in the image data, determining if the pixel is a solid pixel having a depth of shade greater than a predetermined value, increasing a value of a buffer corresponding to the pixel by an increase coefficient if the pixel has the depth of shade greater than the predetermined value, transforming the pixel based on the corresponding buffer value and a gradation coefficient corresponding to the pixel if the pixel does not have the depth of shade greater than the predetermined value, and performing a saturation process on the buffer values so as to prevent a buffer overflow; and arranging for the processed image data to be printed onto a printable medium wherein the depth deterioration is compensated for by an amount which is decreased exponentially in a conveying direction of the printable medium.

* * * * *

UNITED STATES PATENT AND TRADEMARK OFFICE
CERTIFICATE OF CORRECTION

PATENT NO. : 8,134,745 B2
APPLICATION NO. : 12/021411
DATED : March 13, 2012
INVENTOR(S) : Jun Hasegawa Page 1 of 1

It is certified that error appears in the above-identified patent and that said Letters Patent is hereby corrected as shown below:

Title page, Item [73], Delete "Suwon, Si" and insert -- Suwon-si --, therefor.

Title page, Item [57], Line 4, Delete "performs" and insert -- perform --, therefor.

Signed and Sealed this
Third Day of July, 2012

David J. Kappos
*Director of the United States Patent and Trademark Office*